Oct. 15, 1929.     S. F. KOHN     1,731,424
SHEET METAL JOINT
Filed Oct. 20, 1926
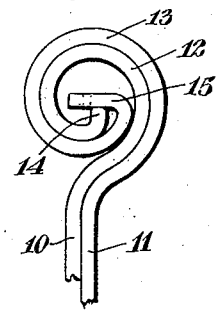
Fig.1.
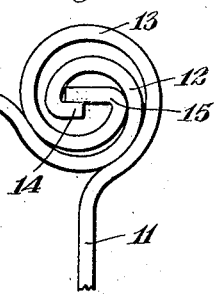
Fig.2.
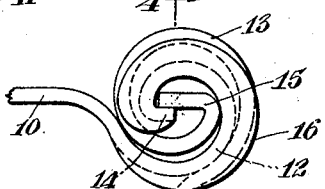
Fig.3.
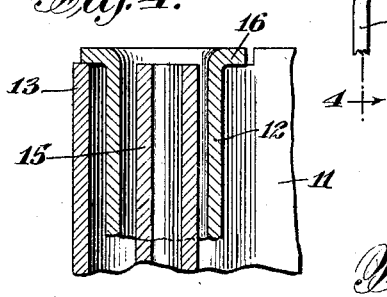
Fig.4.
Fig.5.
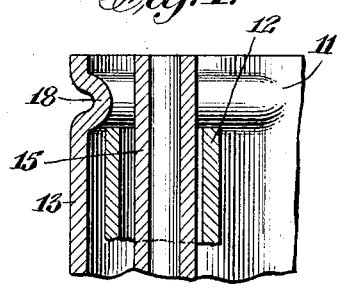
Fig.7.
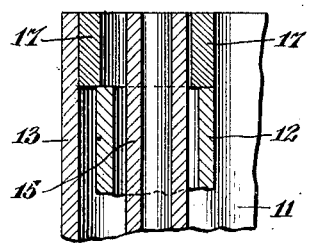
Fig.6.
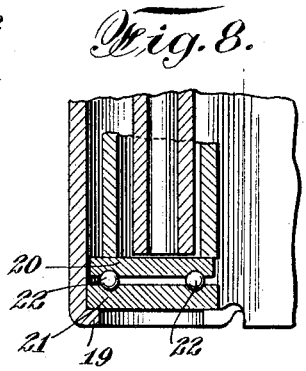
Fig.8.
Inventor
Sigmund F. Kohn
By his Attorney
Daniel L. Morris Patented Oct. 15, 1929

1,731,424

UNITED STATES PATENT OFFICE

SIGMUND F. KOHN, OF BROOKLYN, NEW YORK

SHEET-METAL JOINT

Application filed October 20, 1926. Serial No. 142,821.

The present invention relates generally to improvements in the design and construction of sheet metal joints.

Among the principal objects which the present invention has in view are: To provide a joint adapted to securely fasten a plurality of sheet metal members together while permitting a pivotal and rotatable movement thereof relative to each other; to provide means for limiting the extent of said pivotal movement; to provide a joint of this class such that the sheet metal members may be readily engaged and disengaged from each other; to provide means for insuring their maintenance in service position; and generally to provide improvements in sheet metal joints with a view to simplifying the construction and rendering the same more efficient and reliable.

With the above and other objects in view, the invention further resides in the details of construction more particularly pointed out hereinafter in the following description of the accompanying drawings forming a part of this specification.

In the drawing:

Figure 1 is a plan view of a joint constructed in accordance with the invention showing the sheet metal members in juxtaposition to each other;

Figure 2 is a similar view showing the members spread to the extent of their pivotal movement;

Figure 3 is a plan view of a modification of the invention;

Figure 4 is a sectional view on line 4—4 of Figure 3;

Figure 5 is a plan view of another modification of the invention;

Figure 6 is a sectional view on line 6—6 of Figure 5;

Figure 7 is a sectional elevational view of a further modification of the invention; and Figure 8 is a similar view of still another modification of the invention.

By reference now more particularly to the drawings, it will be seen that the present invention embodies a joint adapted to interlockingly unite two sheet metal members, 10 and 11, while permitting pivotal and rotatable movement thereof relative to each other. To this end the member, 10, terminates in a substantially circular portion, 12, adapted to fit concentrically within a similar circular portion, 13, on the end of the member, 11. The concentrically-disposed portions, being free to rotate relative to each other, thus provide a means for uniting the sheet metal members while permitting them to rotate with respect to each other.

In connection with the above construction, I provide means for limiting the extent of the pivotal movement obtained. This means will be found advantageous when the joint is used at the corners of certain apparatus such as folding cabinets and refrigerators. It also serves to prevent the sheet metal members from becoming unlocked due to their relative rotation only.

In order to so limit the extent of the relative rotation of the members, the free end of the curved portion, 12, has an inwardly extending and substantial radial projection, 14, and the curved portion, 13, has a similar projection, 15. These projections are disposed with respect to one another in the manner best shown in Figure 1. They allow a limited pivotal movement of the sheet metal members but, when said members are rotated relative to each other, they prevent said rotation beyond a certain degree by their abutting against each other as shown in Figure 2. The amount of rotation permitted may, of course, be varied by changing the locations of the projections on the circumferences of the curved portion.

In order to engage or disengage the sheet metal members, it is only necessary to slide them longitudinal of each other. They cannot be disengaged by relative rotation, the projections, 14 and 15, preventing the same.

After the members have been jointed, it may be desirable to prevent them from moving longitudinally with respect to each other and thus insure their maintenance in service position. To this end the inner curved portion, 12, may be allowed to project beyond the outer portion, 13, and the projecting end bent or beaded as at 16 in Figures 3 and 4 to form an abutment for preventing relative longitudinal movement of the members. In lieu of this construction, the outer concentric member may be allowed to project beyond the inner and an internal spring, 17, employed to prevent relative longitudinal movement of the members. This latter construction has an advantage in that the spring may be readily inserted or withdrawn and therefore it may be used or dispensed with, as desired. Instead of the spring, an inwardly struck bead, 18, shown in Figure 7, may be employed for the same purpose.

When the joint is used at the corner of a folding cabinet or the like in which the weight of the parts is considerable, it may be difficult to rotate the members relative to one another because of the friction. In such a case it is desirable to have one of the members rest on ball-bearings to reduce the friction. For example, the construction shown in Figure 8 may be employed in this modification, the outer member has an inwardly extending bead, 19, on which rest two plates, 20 and 21, separated by ball bearings 22 and supporting the inner member. The inner member thus has a ball bearing or anti-friction support which allows it to be readily rotated. The bead, 19, serves to retain the parts in service position.

I do not desire to confine myself to any particular application of the joint as it may be employed with many different kinds of folding and collapsible articles and will find utility when used for other purposes also.

I claim:

A pivotal connection of the class described comprising two sheet metal members, one of said members comprising a flat sheet terminating in a spiral roll the centre of which is substantially in the plane of the second member, the end of said roll lying in the plane of said second member and being oriented in a direction away from said second member, the other of said members comprising a flat sheet terminating in a spiral roll, the centre of which is substantially in the plane of said last mentioned flat sheet, the end of said last mentioned spiral roll terminating in a plane perpendicular to said flat sheet, said spiral rolls fitting concentrically one with the other whereby said members are hinged together and may occupy a position with said flat sheets abutting throughout their entire length.

In testimony whereof, I have signed my name to this specification this 16th day of Oct., 1926.

SIGMUND F. KOHN.